Patented Sept. 2, 1941

2,254,372

UNITED STATES PATENT OFFICE 2,254,372

AZO DYE WOOD STAIN

Donovan E. Kvalnes, Penns Grove, N. J., assignor to E. I. du Pont de Nemours & Company, Wilmington, Del., a corporation of Delaware No Drawing. Application June 22, 1940, Serial No. 341,963

4 Claims. (Cl. 8—3)

This invention relates to azo dyes suitable for the staining of wood. It is old to use azo dyes for the staining of wood but in general the dyes, which are produced as sodium salts, have little solubility in organic solvents and, if applied from a water solution, raise the grain of the wood.

It is my discovery that azo dyes used in a form in which sodium of the salt is replaced by hydrogen are of great value for the staining of wood, because they are of an improved solubility in organic solvents and, when applied, do not raise the grain of the wood. It is also my discovery that the diaminoazobenzene G-salt, when included in an organic solvent of the class illustrated in the examples which follow, is of exceptional value for the staining of wood.

The replacement of the sodium atoms of the dye salt need not be complete, although it may be advantageous, because some of the advantages of the invention are obtained if only a partial replacement occurs.

In general the procedure employed is as follows. The azo dyes, in the form of their sodium salts of the sulfonic acid groups present, are suspended or dissolved in a suitable volume of water at 25° to 100° C. A strong acid is added in excess over the theoretical amount required to convert the NaO₃S— groups to the HO₃S— groups. The amount used can vary over wide limits. Hydrochloric and sulfuric acids are suitable and economical for use.

In a number of cases the free acid form of the dye, in the presence of the strong acid, was found to be quite insoluble and could be filtered off in very good yields. In other cases it was found that good yields could be obtained by the use of a suitable volume, temperature, or concentration of salt.

The dry free acid forms of the dyes in some cases are quite different in color from the corresponding sodium salts, furthermore, they are acidic and care must be taken that they are not dried or used in metal equipment since corrosive action may result. Because of this fact it is advisable in some instances to effect only practical conversion to the free acid form in order that an increase in organic solvent solubility results and yet not have a product which is acidic in reactions.

The following examples are illustrative but not limitative of the invention:

Example I

Fourteen hundred parts of the sodium salt of the azo dye prepared by coupling diazotized aminoazobenzene to 2-naphthol-6,8-disodium sulfonate was stirred with 6800 parts of water and 1030 parts of 10 normal hydrochloric acid for two hours at 25° C. The product was filtered off, washed with 1700 parts of water and dried at 60° C. in a vacuum oven. The purity as the free acid was 95%. The product contained 5% sodium chloride. It has much better solubility in organic solvents such as methyl alcohol, ethyl alcohol, butyl alcohol, toluene, ethylene glycol monomethyl ether, etc., than has the starting material.

Two parts of dye are dissolved in 17 parts of diethylene glycol monoethyl ether and 64 parts of methyl alcohol and 26 parts of toluene are added. This solution when brushed onto wood gives a bright scarlet without causing the grain of the wood to be raised.

Instead of being used alone it can be used in combination with other dyes and other solvents.

Example II

If in Example I only sufficient hydrochloric acid is added to the mixture to give the mixture a pH of 7 to 7.5 and the dye is isolated a neutral product is obtained. It is less soluble in organic solvents than the product of Example I, but is more soluble than the starting material. It can be stored and used in metal equipment without fear of corrosion occurring.

Example III

If the azo dye sulfanilic acid→beta naphthol, in the form of partially converted sodium salt, is substituted for the dye used in Example I, an organic dye is obtained which has better solubility in organic solvents such as methyl alcohol and toluene than the unconverted sodium salt form has, and less corrosion of containers is observable on storing.

Example IV 150 parts of the sodium salt of the monoazo dye, naphthionic acid→1-naphthol-4-sulfonic acid, together with 400 parts of 2N hydrochloric acid were stirred at 25° C. for one hour and then warmed to 40° C. and filtered. The resulting product, when dried, is much more soluble in methyl and ethyl alcohol than the starting material.

Other dyes which illustrate the invention are as follows: They may be applied as hereinbefore indicated.

| Ex. | Alk Acid |
|---|---|
| V. | Aniline→H-acid←p-nitro-aniline |
| VI. | O-toluidine sulfonic acid→beta naphthol |
| VII. | 1-naphthyl amine-3,8-disulfonic acid→1-naphthol-4-sulfonic acid |
| VIII. | Para - xylidine→2-phenylamino-5-naphthol-7-sulfonic acid |
| IX. | Napthionic acid→1-naphthol-3,8-disulfonic acid |
| X. | Metanilic acid→phenyl-methyl-pyrazolone |
| XI. | Dodecylaniline→2-napthol - 6,8 - disulfonic acid |
| XII. | Dodecylaniline→acetyl H-acid |
| XIII. | P-Anisidine→acetyl H-acid |

As many apparently widely different embodiments of this invention may be made without departing from the spirit and scope thereof, it is to be understood that I do not limit myself to the specific embodiments thereof except as defined in the appended claims.

I claim:

1. The method of staining wood which comprises impregnating it with a composition comprising an organic solvent and an azo dyestuff soluble in the solvent having a sulfonic group in the form of its free acid.

2. A wood stain comprising an azo dyestuff containing salt groups at least partially transformed to the free sulfonic acid, and an organic solvent.

3. The process of preparing a wood stain which comprises acidifying a water mixture of aminoazobenzene→G-salt with strong hydrochloric acid, isolating the product, and dissolving it in an organic solvent comprising methyl alcohol, toluene and diethylene glycol.

4. A wood stain comprising aminoazobenzene→G-salt in the form of its free acid and a medium comprising methyl alcohol, toluene and diethylene glycol.

DONOVAN E. KVALNES.

CERTIFICATE OF CORRECTION.

Patent No. 2,254,372. September 2, 1941.

DONOVAN E. KVALNES.

It is hereby certified that error appears in the printed specification of the above numbered patent requiring correction as follows: Page 1, second column, line 42, Example III, for "organic dye" read --orange dye--; and that the said Letters Patent should be read with this correction therein that the same may conform to the record of the case in the Patent Office.

Signed and sealed this 4th day of November, A. D. 1941.

(Seal)

Henry Van Arsdale,
Acting Commissioner of Patents.